DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 1, 1971

827 O.G. 5

T887,007

5-PYRAZOLONE ENOL ESTERS COUPLER PRECURSORS IN FOREHARDENED INCORPORATED-COUPLER COLOR PHOTOGRAPHIC MATERIALS AND METHOD TO CONVERT SAME TO FREE 5-PYRAZOLONE

Dale S. Dallon, Kent R. Rush, Ilmari F. Salminen, and Paul S. Von Bacho, all of Kodak Park, Rochester, N.Y. 14650

Filed Apr. 27, 1970, Ser. No. 32,428
**Int. Cl. G03c *1/40***
U.S. Cl. 96—100
No Drawing. 29 Pages Specification

5-pyrazolone color couplers are incorporated in aldehyde forehardened color photographic emulsions as enol esters of carboxylic and sulfonic acids to prevent reaction of 5-pyrazolone with aldehyde forehardening agent. A method is also provided for the conversion of the enol ester to the free 5-pyrazolone in order that it can couple with oxidized color developer which comprises treating the 5-pyrazolone enol ester with an alkaline solution containing at least one organic amine prior to or concurrent with color development. Enol esters useful within the scope of this invention are illustrated by the general formulae:

(I)

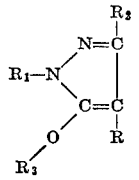

and (II)

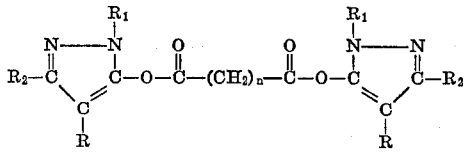

wherein R represents hydrogen, alkyl, thiocyano, acyloxy, heterocycloxy, aryloxy, alkoxy, sulfo, arylazo, aminoarylazoxy, aryltriazolyl, alkylmonothio, arylmonothio and heterocyclicmonothio; $R_1$ represents hydrogen, alkyl, aryl and heterocyclic; $R_2$ represents hydrogen, alkyl, aryl, heterocyclic, amino, carbonamido, sulfonamido, alkylsulfamyl and alkylcarbamyl; $R_3$ represents carboxylic and sulfonic acid radicals and *n* represents a positive integer of from 1 to 8. Amines suitable for treating the enol esters include hydrazine, 1,1-dimethylhydrazine, phenylhydrazine, pyridine, imidazole, ethylenediamine, trimethylamine, triethylamine, 2-aminoethanol and quinuclidine.